(Model.)

A. MURPHY.
PLATING BASKET.

No. 310,146. Patented Dec. 30, 1884.

WITNESSES:
C. Neveux
C. Sedgwick

INVENTOR:
A. Murphy
BY Munn & Co
ATTORNEYS.

UNITED STATES PATENT OFFICE.

ARTHUR MURPHY, OF TAUNTON, MASSACHUSETTS, ASSIGNOR TO HIMSELF AND CHARLES MINCHEW, OF SAME PLACE.

PLATING-BASKET.

SPECIFICATION forming part of Letters Patent No. 310,146, dated December 30, 1884.

Application filed June 2, 1884. (Model.)

*To all whom it may concern:*

Be it known that I, ARTHUR MURPHY, of Taunton, county of Bristol, Massachusetts, have invented a new and Improved Plating-Basket, of which the following is a full, clear, and exact description.

The object of my invention is to provide a new and improved basket or receptacle for holding small articles—such as tacks, rivets, &c.—when dipping them into a metal plating-solution for the purpose of plating them.

The invention consists in a vessel provided with projections on the upper surface of its bottom, which projections are connected by wires, which then pass through channels in the bail or handle, with a hook on the bail or handle, by means of which hook the vessel is suspended in a plating-solution from a suitable conductor.

Reference is to be had to the accompanying drawings, forming part of this specification, in which similar letters of reference indicate corresponding parts in both figures.

Figure 1:
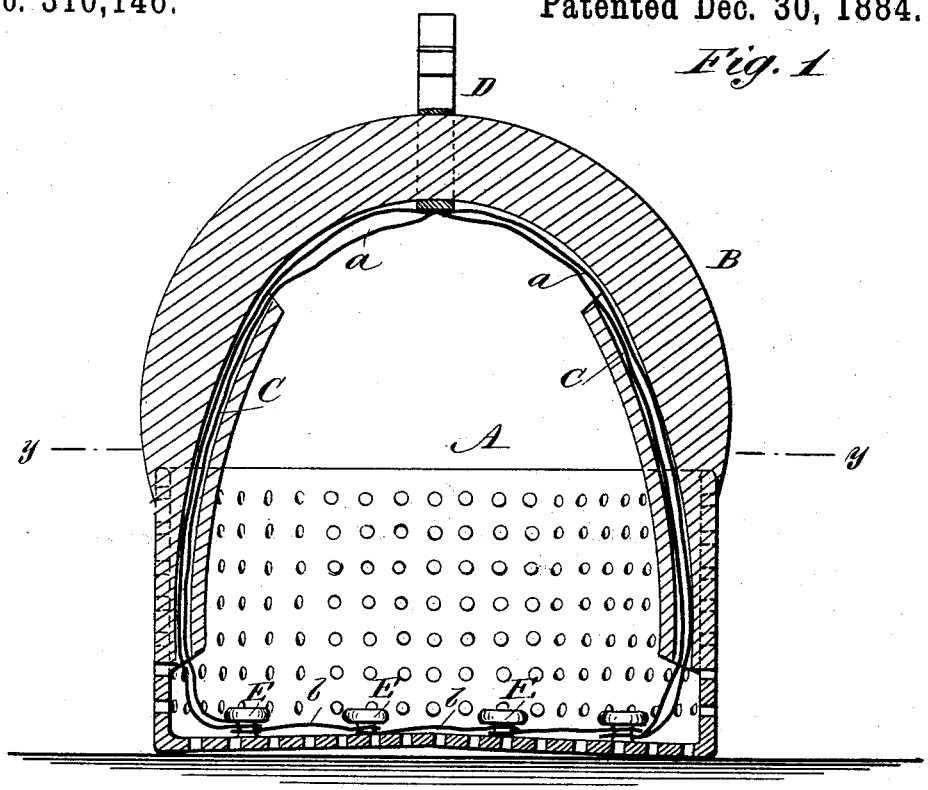
Figure 2:
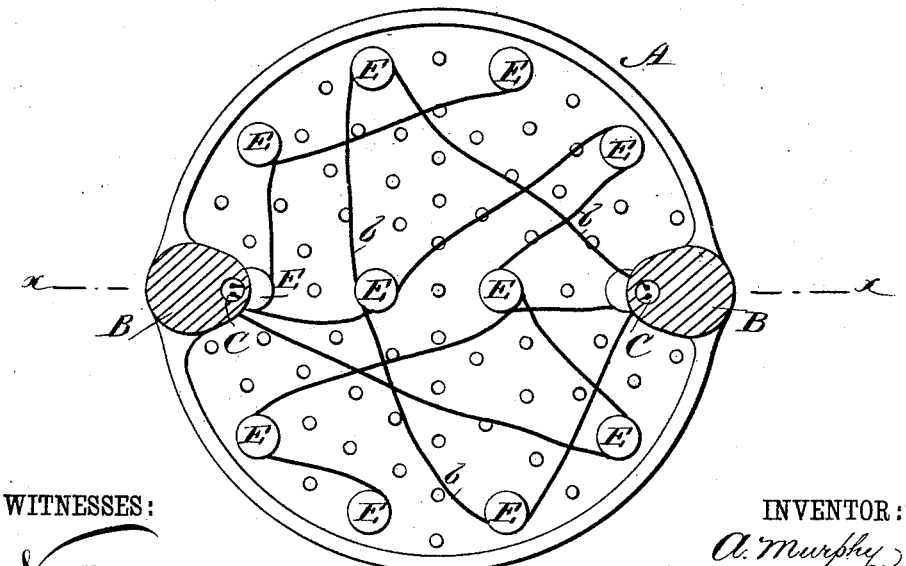

Figure 1 is a longitudinal sectional elevation of my improved plating-basket on the line *x x*, Fig. 2; and Fig. 2 is a sectional plan view of the same on the line *y y*, Fig. 1.

The cylindrical or like vessel A is provided with a curved handle or bail, B, in the inner surface of which two channels, C, are formed, which extend from near the bottom of the vessel to within a short distance from the top of the handle or bail. Numerous conducting-wires, *a*, pass from a hook, D, on the center of the handle or bail to the metal buttons E, projecting from the upper surface of the bottom, and are connected by numerous wires, *b*, extending in all directions over the bottom of the vessel. The vessel A has its bottom and sides perforated, thus forming a basket, and the said vessel is made of a material which is not affected by acids, alkalies, or other chemical solutions, and is an absolute non-conductor of electricity, glazed earthenware being preferred. The tacks, nails, rivets, &c., to be plated are placed in the vessel, and the vessel is placed in a suitable plating-solution, which passes into the vessel through the apertures in its sides and bottom. By means of the hook D the vessel is suspended from an electric conductor, or the hook is connected with a conductor. The current passes through the wires *a b* to the buttons E, and through the plating-solution back to the battery or generator. Any plating-solution can be used, and the articles are plated perfectly in a very short time. After the wires have been passed through the channels in the bail or handle the lower ends of the channels are closed by means of some suitable cement that can easily be removed. This I do for the purpose of preventing the liquid from rising in the channels and depositing metal on the said wires.

In place of using the crossed wires on the bottom of the vessel a screen can be used to good advantage, which screen is connected with the conducting-wires.

Having thus described my invention, I claim as new and desire to secure by Letters Patent—

1. A plating-basket constructed substantially as herein shown and described, and consisting of a non-conducting vessel provided with electric conductors on the upper surface of its bottom, as set forth.

2. The combination, with a vessel, of a series of projections on the upper surface of its bottom, and electric conductors connecting them, substantially as herein shown and described.

3. The combination, with the apertured vessel A, of the buttons E, projecting from the upper surface of the bottom conductors, connecting the buttons, and wires connecting the said conductors with other conductors, substantially as herein shown and described.

4. The combination, with the vessel A, having channels in its bail or handle, of the hook D on the handle or bail, and conductors extending from the hook through the channels to the bottom of the vessel, substantially as herein shown and described.

5. The combination, with the vessel A, having a handle, B, provided with channels C, of the buttons E on the bottom of the said vessel, the hook D, and the wires *a* and *b*, substantially as herein shown and described.

ARTHUR MURPHY.

Witnesses:
FRED. V. BROWN,
F. A. WALKER.